(No Model.)
W. T. LEMON.
WIRE SPLICING TOOL.
No. 254,144.  Patented Feb. 28, 1882.
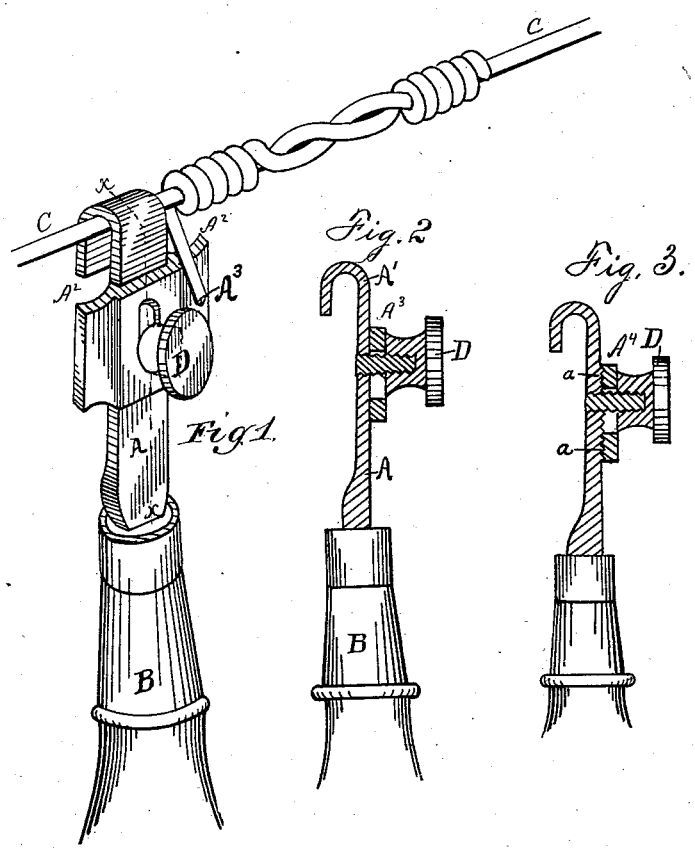
WITNESSES.
Samuel E. Thomas
J. Edward Warren
INVENTOR.
William T. Lemon.
By W. W. Leggett
ATTORNEY.

UNITED STATES PATENT OFFICE.

WILLIAM T. LEMON, OF DETROIT, MICHIGAN, ASSIGNOR TO WM. G. AVERY, OF SAME PLACE.

WIRE-SPLICING TOOL.

SPECIFICATION forming part of Letters Patent No. 254,144, dated February 28, 1882.

Application filed December 2, 1881. (No model.)

*To all whom it may concern:*

Be it known that I, WILLIAM T. LEMON, of Detroit, county of Wayne, State of Michigan, have invented a new and useful Improvement in Wire-Splicing Tools; and I declare the following to be a full, clear, and exact description of the invention, such as will enable others skilled in the art to which it pertains to make and use it, reference being had to the accompanying drawings, which form a part of this specification.

My invention consists of the combinations of devices and appliances hereinafter described, and more particularly pointed out in the claims.

In the drawings, Figure 1 is a perspective view of one of my devices, showing how it is used in making a wire joint. Fig. 2 is a section on line $x$ $x$ of Fig. 1. Fig. 3 is a similar section, illustrating a modification of the adjustable slide.

It is the object of my invention to produce a tool which will perform the work in connection with an ordinary hand-vise or pinchers for grasping and holding the two strands of wire, my said tool being adjustable in order to adapt it for use in splicing wires of various sizes. To this end, A is such a tool, and B its handle. The tool consists of a flat shank having a hooked end, A', which slips over the wire C, while at one or both sides of the hook A' are adjustable shoulders A², which engage with the free end of the wire.

The operation of the device is apparent from the drawings. The hook having been hooked over the wire, the free end of the wire is engaged with the shoulder A², as shown, and the tool is then passed around and around the wire, thus wrapping the one upon the other, as shown.

The shoulders A² are formed by laterally-projecting portions of a slide, A³, adapted by means of a slot and set-screw connection to be adjusted nearer to or farther from the loop or hook A', and be thus adapted for either large or small wires. Instead of making the opposing faces of the slide and the body of the tool plain, they may be serrated, as shown at $a$, so that the slide A⁴ and the shank will readily engage each other, the set-screw D being employed to clamp them together, in which position the serrations will firmly brace the slide against slipping when in use.

I am aware that a wire-splicing tool has heretofore been invented in which a permanent shoulder projects laterally from the base of a hook which is arranged to catch over the wire, and I do not claim such a tool.

In order to make a close and neat joint, the shoulder should be as close as possible to the wire which it is to bend, and a tool provided with a permanent shoulder and adapted for use in splicing wires of large size would be apt to make a loose joint when used with smaller wires.

What I claim is—

1. The wire-splicing tool consisting of a metallic hook and an adjustable shoulder projecting laterally from the shank of said hook, the hook being arranged to catch over a wire and the shoulder to engage the free portion of another wire being spliced therewith, substantially as described.

2. The combination, with the shank provided with the hook A', of the adjustable slide A³, having the laterally-projecting shoulders A², substantially as described.

3. The combination, with the hooked and serrated shank A, of the serrated slide A⁴ and means for clamping said slide to said shank, substantially as described.

In testimony whereof I sign this specification in the presence of two witnesses.

WILLIAM T. LEMON.

Witnesses:
J. EDWARD WARREN,
W. G. AVERY.